Patented Oct. 10, 1944

2,360,238

UNITED STATES PATENT OFFICE 2,360,238

WATER-SOLUBLE HIGH MOLECULAR WEIGHT AMINES

William O. Kenyon and Delbert D. Reynolds, Rochester, N. Y., assignors to Eastman Kodak Company, Rochester, N. Y., a corporation of New Jersey No Drawing. Application August 1, 1940, Serial No. 349,222

4 Claims. (Cl. 260—211)

This invention relates to water-soluble, undegraded amine derivatives of cellulose in which an alkanolamine is combined with an undegraded cellulose, and their preparation.

Previously, amino cellulose derivatives have been prepared which were soluble in dilute acetic acid. However, in the processes of making them harsh reagents, such as caustic alkali, have been employed. As a consequence, the break-down of the cellulose has not been kept at a minimum. Also, the products of those processes did not exhibit water solubility.

It is an object of the present invention to prepare amino cellulose compounds in which the cellulose is not degraded and which exhibit water solubility. Water soluble cellulose compounds have been in demand for many uses. Therefore, cellulose derivatives, which are both water soluble and contain amino groups, are believed to be not only novel but also useful. Other objects will appear herein.

We have found that if an aliphatic carboxylic acid ester of cellulose, containing free and esterifiable hydroxyl groups, is combined with an aryl sulfonic acid group in the presence of a tertiary amine and the resulting product is combined with an alkanolamine all without any degrading action, a water-soluble cellulose compound of good characteristics is obtained. The cellulose ester, which may be employed as the starting material, may have a high hydroxyl content, or it may be one which has only been hydrolyzed to a small extent. For instance, with cellulose acetate, an ester may be used having an acetyl content of approximately 13% or one may be employed which has been hydrolyzed to aqueous acetone solubility, such as down to approximately 37% or any cellulose acetate having an acetyl content between these limits may be employed. Instead of cellulose acetate, other cellulose esters, such as cellulose acetate propionate, cellulose acetate butyrate, cellulose acetate lactate or, in fact, any aliphatic carboxylic acid ester of cellulose having a hydroxyl content comparable to the range given for the cellulose acetate may be employed. It is preferred that the cellulose ester be one of a lower carboxylic acid, such as a lower fatty acid or a lower substituted fatty acid.

As p-toluene sulfonyl halides are readily obtainable, these compounds are preferably employed in the intermediate step in the examples. Instead, however, other aryl sulfonyl halides, such as a benzene sulfonyl halide or $\beta$-naphthalene sulfonyl halide might be employed, preferably in the form of the chloride, with a tertiary amine. Substantially any of the sulfonyl halides in which the sulfonyl is joined to a hydrocarbon, having a benzenoid nucleus, may be employed. As pyridine is a common and well-known tertiary amine, it was employed in the examples to promote the reaction between the cellulose ester and the aryl sulfonyl chloride. Instead of pyridine, however, other tertiary organic bases may be employed, such as quinoline, $\alpha$-picoline or dimethyl aniline in promoting the reaction between the aryl sulfonyl chloride and the cellulose ester.

After the cellulose ester is reacted with the aryl sulfonyl halide, the resulting product is reacted with an alkanolamine, such as ethanolamine or diethanolamine. The use of the diethanolamine derivative is preferred in preparing silver halide photographic emulsions. Instead of ethanolamine, other alkanolamines may be employed, such as isopropanolamine, or for that matter any of the compounds of this type built around lower alkyl groups.

The time and temperature of treatment depend upon the particular compounds being employed. In the preparation of the aryl sulfonates, such as p-toluene sulfonate, the reaction usually proceeds satisfactorily at ordinary temperatures, such as approximately 20° C. and, therefore, as a general rule, the mass may be allowed to stand until the reaction has been completed. In the reaction between the aryl sulfonate of the cellulose ester and the alkanolamine, it is preferred that an elevated temperature be used to promote the reaction. For example, a temperature of 50° C. has been found to promote the combination of the alkanolamine with the cellulose ester. However, to shorten the time of reaction, the temperature may be higher than 50° C., such as at 100° C. or higher. However, any temperature of 50° C. or above may be employed, the only criterion for the maximum being that a temperature, which can be satisfactorily employed and which will not decompose the reacting materials, may be used. As might be expected, a temperature of 100° C. increases the rate of reaction over a temperature of 50° C. in reacting the ethanolamine with the sulfonate of the cellulose ester. In this reaction there may be some deacetylation of the cellulose ester particularly when a high temperature is employed.

In reacting the cellulose ester with the aryl sulfonyl halide, it is preferred that an excess of the tertiary amine is employed although the reaction will take place using an amount of pyridine chemically equivalent to the aryl sulfonyl chloride. As the pyridine not only promotes the reaction but also acts as a solvent, any restricting of the amount of pyridine so that its action as a solvent is effected should be compensated for by adding some inert solvent for example ethylene dichloride or dioxan to the mass.

In using cellulose esters as the starting material for making the aryl sulfonate ester, the starting material is soluble in the tertiary amine, such as pyridine, except with those esters having a low degree of acylation. The latter however go into solution as the reaction proceeds so that the aryl sulfonate of the cellulose ester is in solution in the reaction mass at the end of the reaction.

The product of our invention is a dispersing agent for silver halides which is of value in the preparation of photographic emulsions. The use of these dispersing agents in the preparation of photographic emulsions in which polyvinyl acetaldehyde acetals are used as carriers for the silver halide is described in U. S. Patent No. 2,281,703 of Wesley G. Lowe. Their use in preparing photographic emulsions, where polyvinyl propionaldehyde or butyraldehyde acetals are the carriers for the silver halide, is described in U. S. Patent No. 2,253,078 of Wesley G. Lowe. Their use as dispersing agents for silver halide in photographic emulsions which are sensitized with sulfur compounds is described in U. S. Patent No. 2,276,322. The use of the products of our invention as dispersing agents for silver halides is not our invention.

The following examples illustrate our invention, Example I describing a method of preparing the sulfonic acid ester of cellulose acetate:

Example I 100 parts of hydrolyzed cellulose acetate, having an acetyl content of 22%, was dissolved in 650 parts of pyridine. The solution was cooled to 20° C. and a solution of 380 parts of p-toluene sulfonyl chloride in 500 cc. of pyridine was added thereto. The solutions were mixed together and allowed to stand at 20° C. for about 48 hours. The cellulose acetate-p-toluene sulfonate formed was precipitated in hot alcohol, washed with hot alcohol until entirely free of all reactants, filtered and dried at 50° C. The product had a sulfur content of approximately 9.07%.

Example II 46 parts of cellulose acetate-p-toluene sulfonate, such as prepared in accordance with the preceding example, was mixed with 300 parts of ethanolamine. The mixture was maintained at a temperature of approximately 50° C. for three days. The cellulose ester was practically all reacted and dispersed in the ethanolamine. The dope was filtered and precipitated in an excess of absolute ethyl alcohol. The product was leached with acetone and then extracted for about eight hours with acetone in a Soxhlet extractor to remove residual ethanolamine. The product was dried in a vacuum and was found to contain 6.14% nitrogen. The product obtained was readily soluble in water at room temperature forming a practically colorless, clear viscous dope.

Example III 50 parts of cellulose acetate-p-toluene sulfonate containing 7.84% of combined sulfur was covered with 300 parts of diethanolamine. The mixture was stirred for 2½ hours and then maintained at a temperature of approximately 100° C. for approximately 6½ hours. A small amount of water was added to aid the dissolving of the cellulose derivative and the solution was then poured into an excess of absolute alcohol. The precipitated cellulose derivative was washed with ethyl alcohol and extracted with ethyl alcohol in a Soxhlet extractor for about eight hours followed by air drying. The product, which contained approximately 4% of nitrogen, was soluble in water to produce a viscous, clear, practically colorless dope.

Example IV 30 parts of cellulose acetate-p-toluene sulfonate, containing approximately 8% of sulfur, was mixed with 100 parts of isopropanolamine and maintained at a temperature of approximately 50° C. for about 24 hours. The portion of the cellulose derivative which had dispersed in the isopropanolamine was precipitated from the dispersion with alcohol, thoroughly washed with alcohol and dried. The product was found to contain approximately 5% of nitrogen. The material was readily dispersed in hot water and the resulting dispersion formed a gel on cooling. When water is added to the reaction mixture and the mixture is heated at approximately 100° C. for an additional hour with continuous agitation, the product contains 5.38% of nitrogen and is soluble in water at room temperature.

Example V 60 parts of cellulose acetate, containing 28.1% acetyl, was dissolved in 390 parts of pyridine and was mixed with a solution of 80 parts of p-toluene sulfonyl chloride in 150 parts of dry pyridine. The mass was allowed to stand at normal temperature for 48 hours. The dope formed was then precipitated in warm water containing an amount of acetic acid slightly greater than equivalent to the pyridine employed in the reaction mixture. A thread-like precipitate was obtained which was washed in cold water and dried. A purified sample of this ester showed a sulfur content of 5.9%.

50 parts of this product was mixed with 400 parts of diethanolamine. The mixture was heated on a steam bath with frequent stirring for approximately seven hours, thus forming a dark brown dope. This mass was filtered and precipitated in 95% alcohol. The product was soluble in water at room temperature and had a nitrogen content of approximately 3.1%.

Example VI 50 parts of cellulose acetate containing 34.9% acetyl were dissolved in 250 parts of dry pyridine. This mass was mixed with a solution of 50 parts of p-toluene sulfonyl chloride in 100 parts of dry pyridine. The mass was allowed to stand for 55 hours at room temperature and the dope formed was precipitated in water containing slightly more than sufficient acetic acid to neutralize the pyridine present. The precipitate was thoroughly washed and dried and showed an analysis of 4.6% sulfur. 40 parts of this material was mixed with 400 parts of diethanolamine. The mixture was maintained at a temperature of 100° C. for approximately seven hours with occasional stirring. The material formed was precipitated with alcohol and purified by thoroughly washing with alcohol and with ether. The product was soluble in water at room temperature and had a nitrogen content of approximately 2.43%.

Example VII 50 parts of water soluble cellulose acetate lactate, which had been prepared from cellulose acetate containing 38% acetyl by the method described in the Staud and Webber Patent No.

1,957,856, was dissolved in 300 parts of dry pyridine. This solution was filtered and mixed with a solution of 75 parts of p-toluene sulfonyl chloride in 200 parts of dry pyridine. After stirring for 68 hours at room temperature, the mass was filtered and precipitated in water containing slightly more than sufficient acetic acid to neutralize the pyridine. After thoroughly washing, the precipitate was dried at 60° C. This material contained 7.6% sulfur. 40 parts of this material was mixed with 400 parts of diethanolamine and maintained at a temperature of approximately 100° C. for seven hours with occasional stirring. The dark brown mass which had formed was filtered and the filtrate was subjected to precipitation in a mixture of equal parts of acetone and alcohol. After thoroughly washing to purify, the product was dried. It was found to be soluble in water at room temperature and to have a nitrogen content of approximately 4.3%.

*Example VIII*

190 parts of cellulose acetate propionate, containing 19% acetyl and 14.5% propionyl, were dispersed in 1000 parts of dry pyridine. This solution was mixed with a solution of 300 parts of p-toluene sulfonyl chloride in 200 parts of dry pyridine. The mass was allowed to stand at room temperature for 48 hours. Precipitation was accomplished by using warm water containing slightly more than sufficient acetic acid to neutralize the pyridine. The precipitate was thoroughly washed with both warm and cold water and dried at 60° C. The resulting cellulose acetate propionate-p-toluene sulfonate was found to have a sulfur content of 6.93%. 200 parts of this material was mixed with 1700 parts of diethanolamine and the mixture was maintained at about 75° C. with occasional stirring for 31 hours. The dope, which had formed, was precipitated in a mixture of equal parts of acetone and alcohol. The precipitate was thoroughly washed with acetone and with distilled water and was dried. The resulting product showed a nitrogen content of 2.93%.

It is believed that in the process in accordance with our invention the aryl sulfonyl chloride reacts with the primary hydroxyl groups of the cellulose units to form a sulfonic acid ester which, upon treatment with the alkanolamine, loses the sulfonic acid group with the resultant coupling of the nitrogen of the amine to the number six carbon atom of the glucose unit. The water solubility of the resulting product is believed to be due both to the presence of the hydroxy alkyl groups and to the use of the cellulose ester as the starting material. Instead of using a cellulose ester for the starting material, a starch ester, containing free and esterifiable hydroxyl groups, might be employed, and a similar series of reactions will occur.

It is to be understood that wherever the term aryl sulfonyl chloride is used herein, the aryl designates a benzenoid nucleus, such as benzene, toluene, naphthalene and the like. Wherever the term alkanolamine is employed herein, it refers to an amine in which one or two of the hydrogens thereof are substituted by an alkanol group.

We claim:

1. The process of making ethanolamino-cellulose, the cellulose constituent of which is undegraded, which comprises substantially completely aminating and deacetylating cellulose acetate-p-toluene sulfonate by treating it with an ethanolamine selected from the group consisting of monoethanolamine and diethanolamine until a water-soluble product is obtained.

2. The process of making ethanolamino cellulose, the cellulose constituent of which is undegraded, which comprises substantially completely aminating and deacylating a cellulose ester the acyl content of which comprises lower fatty acid groups and aryl sulfonyl groups by treating it with an ethanolamine selected from the group consisting of monoethanolamine and diethanolamine until a water-soluble product is obtained.

3. The process of making ethanolamino cellulose, the cellulose constituent of which is undegraded, which comprises substantially completely aminating and deacylating a cellulose ester the acyl content of which comprises lower fatty acid groups and aryl sulfonyl groups by treating it at a temperature of approximately 100° C. with an ethanolamine selected from the group consisting of monoethanolamine and diethanolamine until a water-soluble product is obtained.

4. The process of making ethanolamino cellulose, the cellulose constituent of which is undegraded, which comprises substantially completely aminating and deacetylating cellulose acetate-p-toluene sulfonate by treating it at approximately 100° C. with diethanolamine until a water-soluble product is obtained.

DELBERT D. REYNOLDS.
WILLIAM O. KENYON.